No. 730,674. PATENTED JUNE 9, 1903.
A. B. LYONS.
SACCHARIMETER.
APPLICATION FILED MAR. 18, 1902.
NO MODEL.
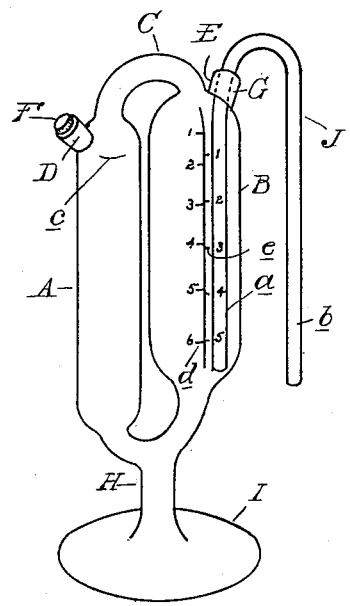
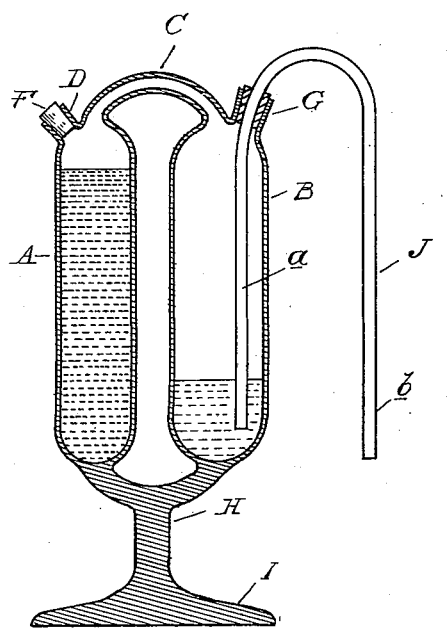
Inventor
Albert B. Lyons
By Tho. S. Sprague & Son.
Attys.
Witnesses No. 730,674. Patented June 9, 1903.

UNITED STATES PATENT OFFICE.

ALBERT B. LYONS, OF DETROIT, MICHIGAN, ASSIGNOR TO NELSON, BAKER & COMPANY, OF DETROIT, MICHIGAN, A CORPORATION OF MICHIGAN.

SACCHARIMETER.

SPECIFICATION forming part of Letters Patent No. 730,674, dated June 9, 1903.

Application filed March 18, 1902. Serial No. 98,725. (No model.)

*To all whom it may concern:*

Be it known that I, ALBERT B. LYONS, a citizen of the United States, residing at Detroit, in the county of Wayne and State of Michigan, have invented certain new and useful Improvements in Saccharimeters, of which the following is a specification, reference being had therein to the accompanying drawings.

The invention relates to improvements in saccharimeters or devices for the detection of small quantities of sugar in solution—as, for example, in the examination of urine.

It is the object of the invention to obtain an instrument by means of which the quantity of sugar in the solution may be very accurately determined and one which is simple and compact in construction.

The invention consists in the construction as hereinafter described and claimed.

In the drawings, Figure 1 is a perspective view of the instrument, and Fig. 2 is a vertical central section therethrough.

The method which is usually employed in testing solutions for saccharine matter is to place the solution to be tested in a closed vessel, together with a small quantity of ferment, and allow it to remain until fermentation of the sugar takes place. This will result in the evolution of carbon dioxid, the quantity generated being exactly proportioned to the amount of sugar in the solution. In the saccharimeters now in use the gas as it collects forces out of the apparatus a portion of the solution containing still unfermented sugar, giving thus an erroneous result. With the present invention the whole of the gas produced in the fermentation is retained in the apparatus, which is so graduated as to indicate by direct reading the exact amount of sugar present. The determination of small quantities of sugar, such as are present in diabetic urine, are thus determined with the greatest facility and accuracy.

As shown in the drawings, the instrument comprises a pair of adjacent vertically-arranged tubes or vessels A and B, connected at their upper ends by a return-bent tube C. The tube A is of lesser diameter than the tube B and is intended to receive the solution to be tested, while the tube B is for the reception and measurement of the gas generated. Each receptacle is provided at its upper end with a fill-aperture formed by the nipples D and E, and these nipples are provided with tight-fitting stoppers F and G. At their lower ends the vessels A and B are connected to a common standard H, having a suitable supporting-base I.

The parts thus far described, with the exception of the stoppers, are preferably formed integral and of glass or other suitable material.

J is a tube passing through the stopper G and having a portion $a$ extending downward to the lower end of the receptacle B. Outside of the receptacle the tube J is given a return-bend and has a downwardly-projecting leg $b$.

The receptacle A is preferably provided with a marking $c$, which indicates the height to which the receptacle is to be filled with the solution to be tested, while the receptacle B is provided with a series of graduations $d$, which are used to indicate the quantity of gas in said receptacle B. These graduations are not uniform or in exact correspondence with the capacity of the receptacle, but are varied for the purpose which will be hereinafter set forth.

In use the receptacle B is first filled with water and the stopper G then inserted in the nipple E, so as to close the receptacle and extend the tube J to the lower end of the receptacle. The solution to be tested is then placed in the receptacle A through the nipple D, together with a suitable quantity of ferment, after which the stopper F is then placed in position and the instrument is allowed to stand. When a sufficient period of time has elapsed, the fermentation of the sugar will take place, and the gas generated thereby will pass upward and through the tube C into the receptacle B. In doing so the water in the receptacle B will be displaced by being forced downward in the receptacle and then out through the tube J. The capacity of the receptacle B is such that ordinarily the whole quantity of water therein will not be displaced, so that the outlet-tube J will remain sealed throughout the operation. In the initial generation of the gas a portion thereof will be absorbed by the solution to be tested; but as soon as this solution becomes saturated with gas the whole quantity subsequently evolved will pass into the receptacle B. Thus in the first stage of the operation the quantity of gas in the receptacle B does not correspond to the entire quantity generated. To compensate for this, the scale or markings $d$ are so graded as to make proper allowance for the amount of gas absorbed by the liquid, and as this quantity is practically uniform where the liquids tested are at the same temperature the result will be that a very accurate measurement of the gas is made. The receptacle B is also preferably provided with a second scale or series of markings $e$, in which the graduations are uniform. This is for the purpose of measuring the gas where the liquid to be tested has been previously charged with carbon dioxid, and thus will not absorb any of the gas generated by the fermentation.

What I claim as my invention is—

1. A saccharimeter comprising a pair of adjacent vessels having an integral tubular connection at their upper ends and each provided with a fill-opening, stoppers for said fill-openings and a discharge-tube passing through one of said stoppers and extending downward to the lower end of the vessel.

2. A saccharimeter comprising a pair of adjacent vertically-arranged tubes or vessels united at their lower ends to a common supporting-base and having a tube connection at their upper ends, each of said vessels being provided with a fill-opening at its upper end, stoppers for said fill-openings and a return-bent tube having one leg thereof passing through one of said stoppers and extending to the lower end of the vessel, while the other leg extends downward without said vessel.

3. A saccharimeter comprising a pair of adjacent vertical tubes having formed integral therewith a supporting-standard at the lower end and a tubular connection at the upper end and each vessel being provided at its upper end with a fill-opening, stoppers for said openings and a tube passing through one of said stoppers and extending to the lower end of the vessel.

4. A saccharimeter comprising a pair of adjacent vertically-arranged tubes of different diameters having formed integral therewith a standard at their lower ends, and a tubular connection at their upper ends, each vessel being provided with a fill-opening at its upper end, stoppers for said fill-openings and a discharge-tube passing through one of said stoppers and extending to the lower end of the vessel.

5. A saccharimeter comprising a pair of adjacent vertically-arranged tubes having a tubular connection at their upper ends, one of said tubes forming a receptacle for the solution to be tested and the other a displacement-receptacle for the gas, the latter receptacle being provided with a series of markings which are graded to compensate for the gas absorbed in the initial generation.

6. A saccharimeter comprising a pair of adjacent tubes having a tubular connection at their upper ends, one of said tubes forming a receptacle for the solution to be tested and the other a displacement-receptacle for the gas, the latter tube being provided with two series of markings, one graded to compensate for the gas absorbed by the solution and the other being uniform in graduation for testing solutions saturated with gas.

7. A saccharimeter comprising a pair of adjacent vessels having tubular connections at their upper ends, one of said vessels forming a receptacle for the solution to be tested and the other a displacement-receptacle for the gas, the latter being provided with a series of markings for measuring the gas in the receptacle.

8. A saccharimeter, comprising a pair of adjacent vertical tubes having formed integral therewith a supporting-standard at the lower end, and a tubular connection at the upper end, means for the introduction of liquid into each of said tubes, and a discharge-conduit for one of said vertical tubes connecting with the lower end of the chamber therein and extending upward to above the level of the liquid in said tube.

In testimony whereof I affix my signature in presence of two witnesses.

ALBERT B. LYONS.

Witnesses:
T. E. CORNWALL,
F. D. BENJAMIN.